US008775741B1

(12) United States Patent
de la Iglesia (10) Patent No.: US 8,775,741 B1
(45) Date of Patent: Jul. 8, 2014

(54) USING TEMPORAL ACCESS PATTERNS FOR DETERMINING PREFETCH SUITABILITY

(75) Inventor: Erik de la Iglesia, Sunnyvale, CA (US)

(73) Assignee: Violin Memory Inc., Santa Clara, CA (US)

( * ) Notice: Subject to any disclaimer, the term of this patent is extended or adjusted under 35 U.S.C. 154(b) by 281 days.

(21) Appl. No.: 12/684,387

(22) Filed: Jan. 8, 2010

Related U.S. Application Data

(60) Provisional application No. 61/144,404, filed on Jan. 13, 2009, provisional application No. 61/144,395, filed on Jan. 13, 2009.

(51) Int. Cl.
*G06F 12/08* (2006.01)
*G06F 12/06* (2006.01)

(52) U.S. Cl.
CPC ........ *G06F 12/0862* (2013.01); *G06F 12/0615* (2013.01)
USPC ........... 711/137; 711/173; 711/167; 711/169; 711/204; 711/E12.057

(58) Field of Classification Search
CPC ........................ G06F 12/0862; G06F 12/0615
USPC .......... 711/137, 173, 204, E12.057, 167, 169, 711/213
See application file for complete search history.

(56) References Cited

U.S. PATENT DOCUMENTS

| | | | |
|---|---|---|---|
| 6,381,677 B1 * | 4/2002 | Beardsley et al. ............ | 711/137 |
| 6,401,147 B1 | 6/2002 | Sang et al. | |
| 6,633,955 B1 * | 10/2003 | Yin et al. ...................... | 711/114 |
| 6,678,795 B1 | 1/2004 | Moreno et al. | |
| 6,721,870 B1 * | 4/2004 | Yochai et al. ................. | 711/204 |
| 6,742,084 B1 * | 5/2004 | Defouw et al. ............... | 711/133 |
| 6,789,171 B2 * | 9/2004 | Desai et al. ................... | 711/137 |
| 6,810,470 B1 | 10/2004 | Wiseman et al. | |
| 7,017,084 B2 | 3/2006 | Ng et al. | |
| 7,089,370 B2 | 8/2006 | Luick | |
| 7,110,359 B1 | 9/2006 | Acharya | |
| 7,856,533 B2 * | 12/2010 | Hur et al. ...................... | 711/137 |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,214,599 B2 * | 7/2012 | de la Iglesia et al. ......... | 711/137 |
| 2002/0035655 A1 | 3/2002 | Finn et al. | |
| 2002/0175998 A1 * | 11/2002 | Hoang .......................... | 725/146 |
| 2002/0194434 A1 * | 12/2002 | Kurasugi ...................... | 711/137 |
| 2003/0012204 A1 | 1/2003 | Czeiger et al. | |
| 2003/0167327 A1 | 9/2003 | Baldwin et al. | |
| 2003/0177168 A1 | 9/2003 | Heitman et al. | |
| 2004/0215923 A1 | 10/2004 | Royer | |

(Continued)

OTHER PUBLICATIONS

Rosenblum, Mendel and Ousterhout, John K., The LFS Storage Manager. Proceedings of the 1990 Summer Usenix. 1990 pp. 315-324.

(Continued)

*Primary Examiner* — Pierre-Michel Bataille
(74) *Attorney, Agent, or Firm* — Brinks Gilson Lione (57) ABSTRACT

A storage control system includes a prefetch controller that identifies memory regions for prefetching according to temporal memory access patterns. The memory access patterns identify a number of sequential memory accesses within different time ranges and a highest number of memory accesses to the different memory regions within a predetermine time period.

18 Claims, 7 Drawing Sheets

(56) References Cited

U.S. PATENT DOCUMENTS

| | | |
|---|---|---|
| 2005/0025075 A1 | 2/2005 | Dutt et al. |
| 2005/0195736 A1 | 9/2005 | Matsuda |
| 2005/0204113 A1* | 9/2005 | Harper et al. ............. 711/170 |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1* | 5/2006 | Zohar et al. ............. 711/137 |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0162864 A1 | 7/2008 | Sugumar et al. |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |

OTHER PUBLICATIONS

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

Stolowitz Ford Cowger Listing of Related Cases, Feb. 7, 2012.

\* cited by examiner

Repeated FIG. 5 (t7 − t1) > 5 minutes

FIG. 10

USING TEMPORAL ACCESS PATTERNS FOR DETERMINING PREFETCH SUITABILITY

This application claims priory to U.S. provisional patent application Ser. No. 61/144,404 filed Jan. 13, 2009 and U.S. provisional patent application Ser. No. 61/144,395 filed Jan. 13, 2009 which are both herein incorporated by reference in their entirety.

BACKGROUND

Prefetching is a caching technique used to improve the performance of disk and memory systems. Whereas nominal caching increases performance by keeping copies of accessed data in the hope that it will be accessed again, prefetching loads the caching memory before an access to data in the hope it will be accessed soon. The information required for a successful prefetch includes:

What data to prefetch

The circumstances under which the prefetch should occur

The length of time to keep prefetched data cached (if no access occurs)

The effectiveness of a disk prefetch is dependent on the correct prediction of the future read patterns over the disk. Predictions can be based on guesses or historical observation. An example of a typical guess involves the concept of "spacial locality" which predicts that a future read is likely to occur in proximity by address to the last read. Historical observations involve recognizing patterns of access, such as address B always follows A and address C always follows B.

If the wrong data is prefetched, no accesses to the data will occur and no performance improvements will be realized. Likewise, if the right data is fetched at the wrong time, it may be replaced by other caching data before the access occurs. Incorrectly specifying the "keep time" will have a similar effect.

In a storage system, defining a prefetch sequence and effectively guessing what future data accesses will be, is a computationally intensive and sometimes intractable task.

SUMMARY

The complexity and computational requirements of tracking access patterns to a storage device is simplified so that a determination of data prefetch suitability can be made in real-time rather than after extensive analysis.

DETAILED DESCRIPTION

Figure 1:
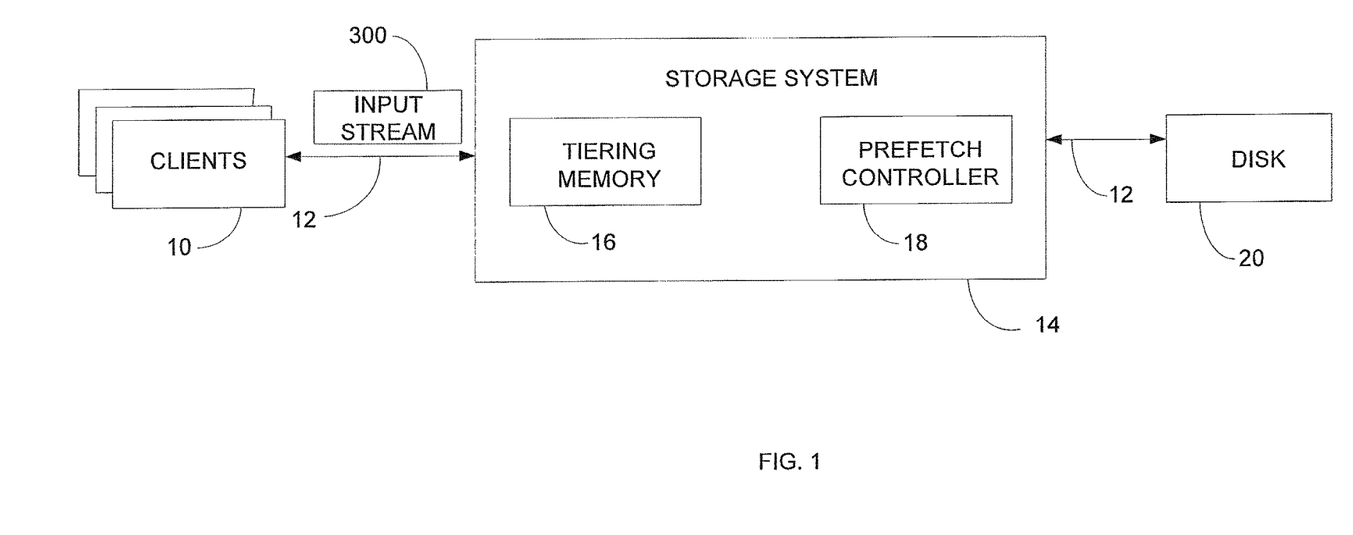
FIG. 1 is a block diagram of a storage control system that analyzes temporal data storage access patterns for determining prefetch suitability.

Referring to FIG. 1, a storage system 14 is located between one or more clients 10 and a disk or disk array 20. The client 10 may be a server, personal computer, Personal Digital Assistant (PDA), or any other wired or wireless computing device that needs to access data on disk 20. In one embodiment, the storage system 14 is a stand-alone appliance, device, or blade, and the disk 20 is a stand-alone disk storage array. In this embodiment, the client 10, storage system 14, and disk 20 are each coupled to each other via wired or wireless Internet connections 12. In an alternate embodiment, a storage fabric (such as fiber channel) or network fabric (such as Ethernet) is used to connect client 10, storage system 14 and disk 20.

In another embodiment, the client 10 may be a processor in a personal computer that accesses one or more disks 20 over an internal or external data bus. The storage system 14 in this embodiment could be located in the personal computer or server 10, or could also be a stand-alone device coupled to the computer/client 10 via a computer bus or packet switched network connection, such as a Small Computer System Interface (SCSI) connection.

The storage system 14 accepts reads and writes to disk 20 from client 10 and contains a tiering memory or media 16 used for accelerating the client 10 accesses to disk 20. In one embodiment, the tiering memory 16 could be any combination of Dynamic Random Access Memory (DRAM) and/or Flash memory. Of course, the tiering memory 16 could be implemented with any combination of memory devices that provide relatively faster data access than the disk 20.

A prefetch controller 18 includes any combination of software and/or hardware within storage system 14 that controls tiering memory 16. For example, the prefetch controller 18 could be a processor that executes software instructions to provide the prefetch operations. The prefetch controller 18 determines what data to prefetch, when to prefetch the data, and how long to store the prefetch data in tiering memory 16.

During a prefetch operation, controller 18 receives a storage access request from client 10. The controller 18 accesses the corresponding address in disk 20 and stores the data in tiering memory 16. The prefetch controller 18 also prefetches other data from disk 20 that is likely to be subsequently accessed by the client 10. If subsequent reads or writes from client 10 are for the data prefetched into tiering memory 16, storage system 14 returns the data directly from tiering memory 16. Such a direct return from faster tiering memory 16 to client 10 is referred to as a "hit" and improves the performance of applications running on client 10. For example, a memory access to disk 20 can take several milliseconds while a memory access to tiering memory 16 may be in the order of microseconds.

Prefetch controller 18 can operate in both a monitoring mode and an active mode. During the monitoring mode, the prefetch controller 18 records and analyzes read and/or write disk access operations in input stream 300 from client 10 to disk 20. The prefetch controller 18 then uses the monitored information to construct heuristics or histograms for performing subsequent tiering operations. When sufficient information has been gathered, the prefetch controller 18 switches from the monitoring mode to an active mode. The active mode prefetches data from disk 20 into tiering memory 16 according to the heuristics and histograms obtained during the monitoring mode. In another embodiment, prefetch controller 18 always operates in active mode and implements a default set of tiering operations (such as always prefetching from the next storage address) until the heuristics determine a better strategy.

Recording of disk accesses is performed by maintaining a log of the time, data address (location of the read or write), and length of the operation (number of addresses to read or write within one command). The address is often expressed in terms of blocks (such as a read of blocks 100-200) where disk 20 is viewed as a large contiguous region of blocks. The length of the disk access operation is similarly expressed as a number of blocks. Thus, every read or write from client 10 to disk 20 can be viewed as affecting a block range (from address to address plus length).

To reduce complexity of the analysis stage and therefore computational time, the read operations from the clients 10 to the disk array 18 are compressed to a reduced version in a way that does not degrade the quality of prefetch predictions. This reduction reduces the computation requirements of the subsequent prediction.

Figure 2:
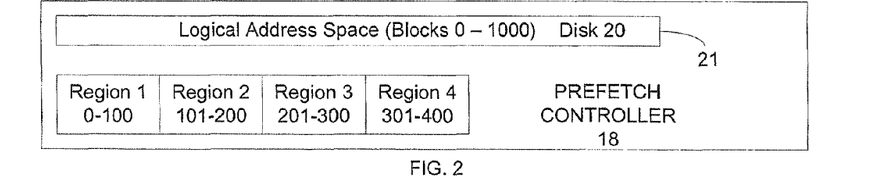
FIG. 2 shows a logical storage address mapping used by the storage system of FIG. 1.

FIG. 2 shows an example of a logical mapping of the physical memory within the disk 20 into different logical blocks. Different 64 Kbytes of memory in disk 20 may be addressed by the prefetch controller 18 using a same logical block. In this example, the disk 20 is partitioned into a logical address space 21 of 1000 blocks. Logical blocks 0-100 are associated by the prefetch controller 18 with a region 1, blocks 101-200 are associated with a region 2, blocks 201-300 are associated with a region 3, and blocks 301-400 are associated with a region 4. The rest of the blocks 401-1000 are similarly associated with other logical memory regions. The logical address mapping shown in FIG. 2 is stored in memory that is accessible by the prefetch controller 18.

Of course, this is just one example of how physical blocks of memory in disk 20 can be logically mapped to different logical regions. For example, each region may not necessarily contain 100 blocks and different regions may contain different numbers of blocks. Schemes used by the prefetch controller 18 for deriving the number and size of logical regions in disk 20 are described in U.S. patent application Ser. No. 12/605,119, entitled: STORAGE DEVICE PREFETCH SYSTEM USING DIRECTED GRAPH CLUSTERS, filed Oct. 23, 2009 and U.S. patent application Ser. No. 12/619,609, entitled: CLUSTER CONTROL PROTOCOL, filed Nov. 16, 2009 which are both herein incorporated by reference in their entirety.

Figure 3:
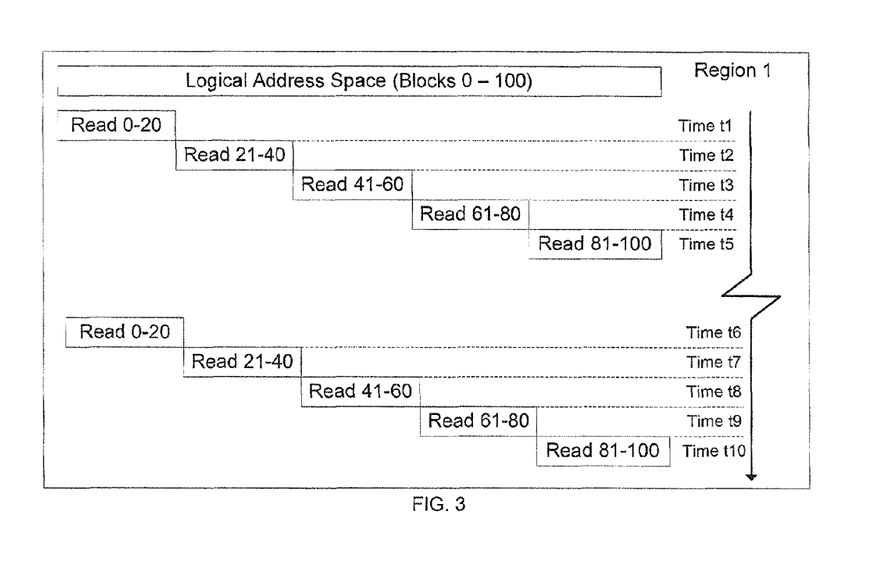
FIGS. 3 and 4 show a good temporal storage access pattern for prefetching.

FIG. 3 shows one example of a storage access pattern for address region 1 where prefetching operations could be used to increase access performance. In this example different accesses to region 1 are sequential and relatively close together in time. For example, a read to blocks 0-20 in region 1 at time t1 is closely followed by a second read to blocks 21-40 in region 1 at time t2. A read to blocks 41-60 in region 1 at time t3 is closely followed by a read to blocks 61-80 at time t4 and then a read to blocks 81-100 at time t5. Times t1-t5 are relatively close together and every block in region 1 is read within the relatively short time interval between t1 and t5.

A relatively longer time period exists between time t5 and time t6. This is represented by the jagged line on the right side of FIG. 3. However, at the next time t6, the same read pattern repeats as previously shown between times t1 and t5. For example, all of the blocks in region 1 are read in close sequence and within a relatively short time period between time t6 and t10.

In this example, memory access time to region 1 would be substantially improved by prefetching the entire region 1 of blocks 0-100 into tiering media 16 whenever there is an initial read to blocks 0-20. This is because all other blocks 21-100 are likely to subsequently be read by the client 10 after reading blocks 0-20. Prefetching blocks 21-100 into the faster tiering media 16 allows the storage system 14 to then provide faster access to the blocks in region 1 via tiering media 16 instead of slower access via the slower disk memory 20. Further, all of the blocks in region 1 are likely to be accessed within the relatively short time period between time t1 and time t5. Thus, none of the blocks in region 1 are unnecessarily stored in the tiering media 18 when the prefetch of region 1 is performed.

Figure 4:
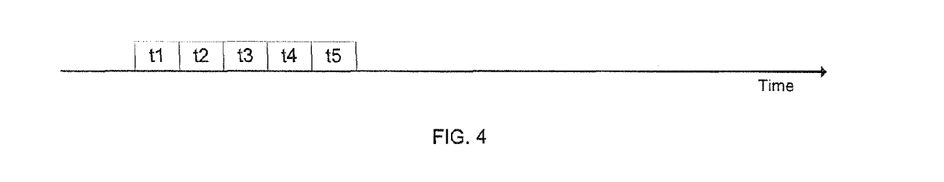

FIG. 4 shows the timeline for the read access pattern for region 1. It can be seen that all of the reads to region 1 are situated closely together and all occur within a relatively short time period. This is a particular type of read access pattern that the prefetch controller 18 is configured to identify for prefetching.

Figure 5:
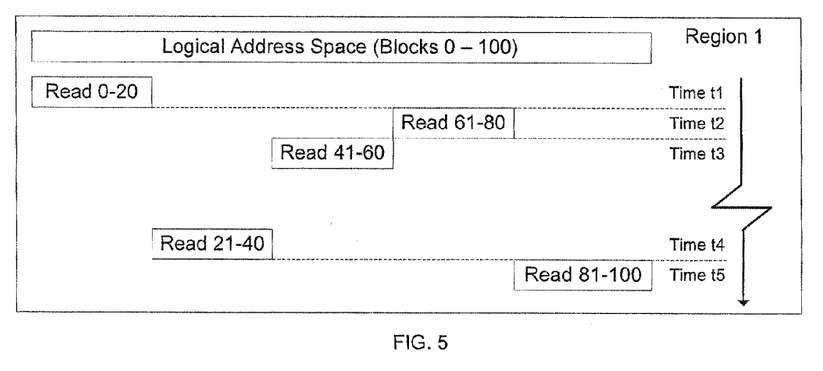
FIGS. 5 and 6 show a poor storage access pattern for prefetching.
Figure 6:
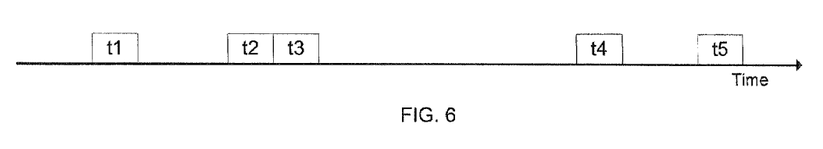

FIGS. 5 and 6 show a read access pattern to region 1 that would not substantially benefit from prefetching. In this example, the block reads are not sequential and a substantially smaller percentage of blocks from region 1 are read within a relatively short time interval. For example, blocks 0-20 are read at time t1, blocks 61-80 are read at a later time t2 which is not immediately after the read of blocks 0-20. Blocks 41-60 are then read at a time t3. Then after an even longer time delay, blocks 21-40 are read at time t4 and blocks 81-100 are read at time t5.

Only half of the prefetched blocks in region 1 could be used if all blocks 0-100 were prefetched into tiering media 16. For example, too much time exists between time t3 and t4 to keep all of the blocks in region 1 in tiering media 16 until time t5. Thus, the blocks in region 1 would have to be removed from tiering media 16 before blocks 21-40 and 81-100 could be read. Blocks 21-40 and 81-100 would then have to be reread from disk 20 at time t4.

FIG. 6 shows the timeline for the read accesses to region 1 in FIG. 5. As can be seen, after the first read is performed at time t1, no other reads are performed for a substantial period of time. Then two sequential reads are performed at times t2 and t3 followed by an even longer period of time before the read at time t4. Another delay exists before the final blocks 81-100 are read by the client 10 at time t5. In summary, the block reads in FIG. 5 are not sequential and back to back reads are not closely spaced together in time. Thus, prefetching all of the blocks in region 1 responsive to the first read of blocks 0-20 at time t1 would result in unnecessary reads from disk 20 and unnecessary storage of data in the tiering media 16. The prefetch controller 18 in FIG. 1 also identifies read patterns such as those shown in FIG. 6 that are not good candidates for prefetching.

Figure 7:
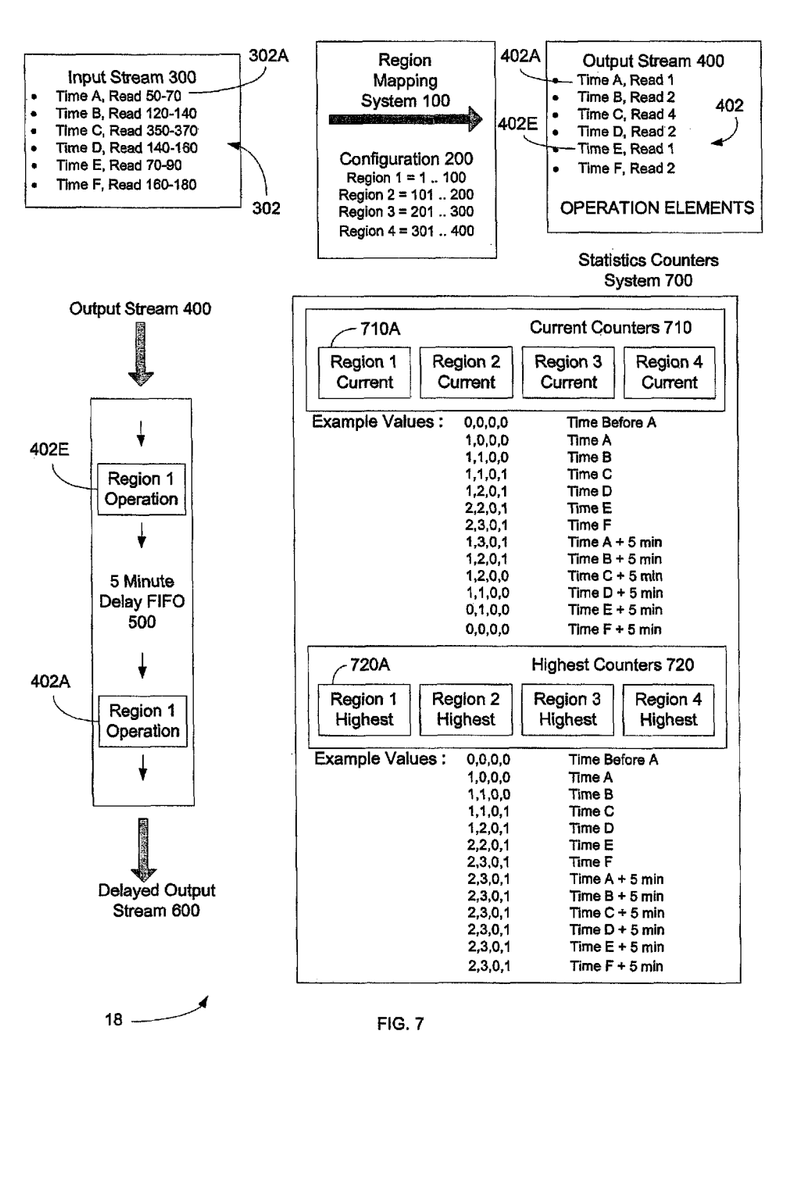
FIGS. 7 and 8 are block diagrams showing in more detail how a prefetch controller in the storage control system of FIG. 1 operates.
Figure 8:
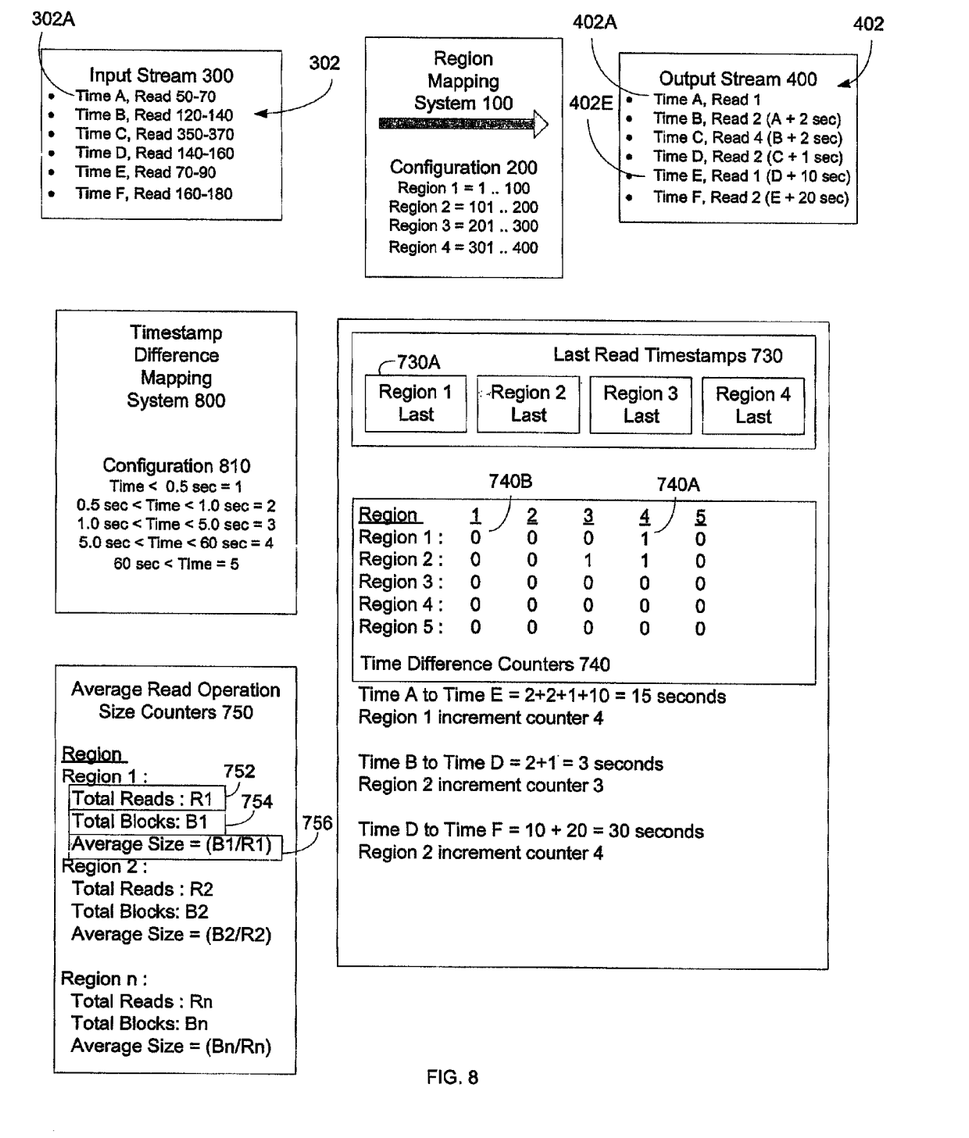

FIGS. 7 and 8 are more detailed diagrams of the operations and logic elements used by the prefetch controller 18 in FIG. 1 during the analysis and prefetching stages. The prefetch controller 18 observes sequences of storage access operations 302 in the input stream 300 sent from the clients 10 to the disk storage array 18 shown in FIG. 1. The prefetch controller 18 generates temporal histograms from the observed storage access operations that are then used to determine what data from disk 20 to prefetch into tiering media 16, when to fetch the data, and how long to store the prefetched data in the tiering media 16.

The prefetch controller 18 identifies a timestamp, starting address, and read length for each read operation 302 in the storage accesses observed in input stream 300. For example, the prefetch controller for the read operation 302A assigns "Time A, Read 50-70". The letter A represents a timestamp value, the value 50 refers to the starting block address for the read operation, and the value 50-70 refers to a read length of 20 blocks.

The prefetch controller 18 uses the starting address and read length to map each read operation 302 to a logical region using logic referred to as region mapping system 100. In one embodiment, region mapping system 100 is statically programmed utilizing previous read pattern analysis. This static programming is contained within a stored configuration register 200.

In an alternative embodiment, region mapping system 100 dynamically modifies configuration register 200 based on a monitored sequence of read operations. For example, as described in U.S. patent application Ser. No. 12/605,119, entitled: STORAGE DEVICE PREFETCH SYSTEM USING DIRECTED GRAPH CLUSTERS, filed Oct. 23, 2009 and U.S. patent application Ser. No. 12/619,609, entitled: CLUSTER CONTROL PROTOCOL, filed Nov. 16, 2009 which have both been incorporated by reference in their entirety. In a further possible embodiment, configuration 200 is managed by some external entity.

Region mapping system 100 interprets input stream 300 consisting of read operations 302 and produces an output stream 400 consisting of region operation elements 402. Each operation element 402 in output stream 400 contains a region number as opposed to the start address and read length of the original read operation. For example, read operation 302A "Time A, read 50-70" in input stream 300 is converted by the prefetch controller 18 into operation element 402A "Time A, Read 1" in output stream 400.

Output stream 400 is thus a transformation of input stream 300 such that the numeric range of regions is substantially lower than the range of read addresses possible in input stream 300. In a typical example, input stream 300 may span an address space from 0 to several hundred million (N×10e8) while output stream 400 contains at most 100,000 (1×10e6) regions. Thus, first region mapping system 100 bounds the number of different read accesses that have to be further analyzed to a substantially smaller subset of regions.

The output stream 400 of operation elements are input into delay First In-First Out (FIFO) memory device 500 where it is output at some pre-configurable time later as delayed output stream 600. The length of delay (time output stream 400 is retained in FIFO 500) is chosen based on experimental knowledge with typical lengths of 5 minutes, 10 minutes or 15 minutes. For example, a particular operation element 402A "Time A, Read 1" in output stream 400 is output as part of delayed output 600 five minutes after it is initially loaded into FIFO 500.

The FIFO 500 is controlled by the prefetch controller 18 so that any operation element 402 input into FIFO 500 is output in approximately the same amount of time data can be stored in the tiering media 16. For example, if data can only be stored in tiering media 16 for 5 minutes, then the operation elements 402 are only stored in FIFO 500 for 5 minutes. This allows the prefetch controller 10 to generate statistics in the form of temporal histograms that can then be used to identify good read patterns for prefetching. Of course other time delays could also be used based on the data access patterns of client 10 with disk 20 (FIG. 1). In an alternate embodiment, the length of time operation element 402 is stored within FIFO 500 is independent of the properties of the tiering media.

The time delay in FIFO 500 sets the pattern recognition time of a next analysis stage. In practice, delay FIFO 500 is designed to receive an arbitrary number of operation elements from output stream 400. Upon each insertion, software in the prefetch controller compares the timestamp of the inserted operation element 402 against the time stamp of the oldest operation element still in the FIFO 500. Conceptually, the oldest operation element is the next item output/removed from the bottom end of the FIFO 500.

If the time difference between the top/newest operation element 402 in FIFO 500 and the oldest operation element 402 at the bottom of FIFO 500 is longer than the configured time length (e.g., 5 minutes), the oldest operation element is removed from the FIFO 500. Removal continues until the oldest operation element 402 is less than the "time length" older than the last inserted element (e.g., less than 5 minutes). In this manner, delay FIFO 500 will contain operation elements 402 which differ in timestamp value by no more than the "time length" value.

Upon each insertion of an operation element 402 into delay FIFO 500, counter system 700 increments a selected counter among current counters 710 indexed to the region of the associated read operation. In the example shown in FIG. 7, the read operation 302A at time A is mapped to region 1 in operation element 402A. This causes region 1 current counter 710A to increment. The number of current counters 710 is equal to and directly configured from the number of regions defined in configuration register 200. As mentioned above, based on prior block access monitoring, the number and size of the regions in configuration register 200 can be advantageously clustered together based on observed disk access patterns. This allows the prefetch controller 18 to more efficiently group together sequential disk accesses.

Upon each extraction of an operation element 402 from delay FIFO 500, statistics counters system 700 decrements a selected one of current counters 710 corresponding with the region of the extracted region operation element 402.

For example, the read operation 300A with timestamp A is mapped to region 1 as region operation element 402A. At a time after time A, set by the "time length" and given as 5 minutes in this example, the operation element 402A is extracted/deleted from delay FIFO 500 causing region 1 current counter 710A to decrement.

Prior to the counter decrementing, system 700 compares the region 1 current counter 710A with a corresponding region 1 highest counter 720A. Highest counter 720A is part of a parallel set of counters, Highest Counters 720, that maintain the highest watermarks for Current Counters 710. When region 1 current counter 710A is higher than the region 1 highest counter 720A, the value in current counter 710A replaces the value in region 1 highest counter 720A. In this manner, the highest counters 720 maintain the highest number of read operations that occurred within each region during the 5 minutes time window/delay within FIFO 500.

Referring also to FIG. 8, upon each extraction of an operation element 402 from delay FIFO 500 in FIG. 5, last read timestamps 730 in FIG. 8 are consulted by the prefetch controller 18 to obtain the timestamp of the last read operation within the specified region. The time difference value is used by logic in the prefetch controller 18 referred to as the timestamp difference mapping system 800 to create an index of difference counters 740. Difference mapping system 800 uses a configuration 810 stored in a register or local memory to map ranges of time differences into corresponding indices recorded by counters 740. Upon calculation of the index, the last read timestamp 730 for the specified region is updated with the timestamp of the current extracted region operation.

For example, the output stream 400 shows operation elements 402A and 402E associated with reads to region 1 and occurring at times A and E, respectively. The operation elements 402A and 402E indicate back to back reads to region 1 that have a time delay of 15 seconds. This total time delay between the reads associated with elements 402A and 402E is shown calculated underneath difference counters 740. Upon extraction of the time A for operation element 402A from FIFO 500 in FIG. 7, the last read timestamp 730A associated with region 1 is set to time A.

Upon extraction of the operation element 402E from FIFO 500 identifying time E and region 1, the time difference between A and E (15 seconds) is determined by timestamp difference mapping system 800 to be within a time range in configuration 810 that corresponds to an index value of 4 (range between 5.0 seconds to 60 seconds).

Time difference counters 740 are then updated by the prefetch controller 18 by incrementing the difference counter 740A that corresponds with region 1 and time index 4. The total number of time difference counters 740 is equal to the product of the number of regions in configuration register 200 and the number of time indices/ranges in configuration 810. The number and exact values of comparison time ranges in configuration 810 are determined through experimentation and analysis of sample data.

For example, Co-pending patent application Ser. No. 12/605,119, entitled: STORAGE DEVICE PREFETCH SYSTEM USING DIRECTED GRAPH CLUSTERS, filed Oct. 23, 2009 and U.S. patent application Ser. No. 12/619, 609, entitled: CLUSTER CONTROL PROTOCOL, filed Nov. 16, 2009 describes schemes for determining the values used in configuration register 200 and configuration 810. Of course other static or dynamic techniques can also be used to determine the values in configuration register 200 and time difference configuration 810.

Thus, the above prefetch controller 18 and the counters in FIGS. 7 and 8 provide a compact representation or temporal histogram of temporal access patterns for a configurable set of memory regions associated with disk 20. The derived access patterns can be used for any variety of different memory management operations, such as for performing prefetching of data into the tiering memory 16 as will be described below.

The prefetch controller 18 can also maintain average size counters 750 for each of the different storage regions identified in configuration register 200. The prefetch controller 18 maintains counters 752 that track the number of reads to each of the different regions in register 200 and counters 754 that track the total number of blocks read from each of the different regions identified in register 200. The prefetch controller 18 can then derive an average read size value in registers 756 for each of the different regions in register 200 by dividing the total number of blocks identified in counters 754 by the corresponding total number of reads identified in counters 752.

The average read size in register 756 can then be used to determine how much data to prefetch from an associate region of disk 20. For example, the highest count 720 for a particular region may be multiplied by the average block read size in register 756. The resulting value would be the amount of data that is prefetched from a particular region. This is described in more detail below in FIG. 9.

Determining Prefetch Suitability

It has been determined that prefetching is highly effective when two conditions are met:
1) The entire region is read completely during a pattern of activity
2) The entire region is read quickly during a pattern of activity Accordingly, to determine prefetch suitability of a region, the highest counters 720 and time difference counters 740 for each region are examined.

Figure 9:
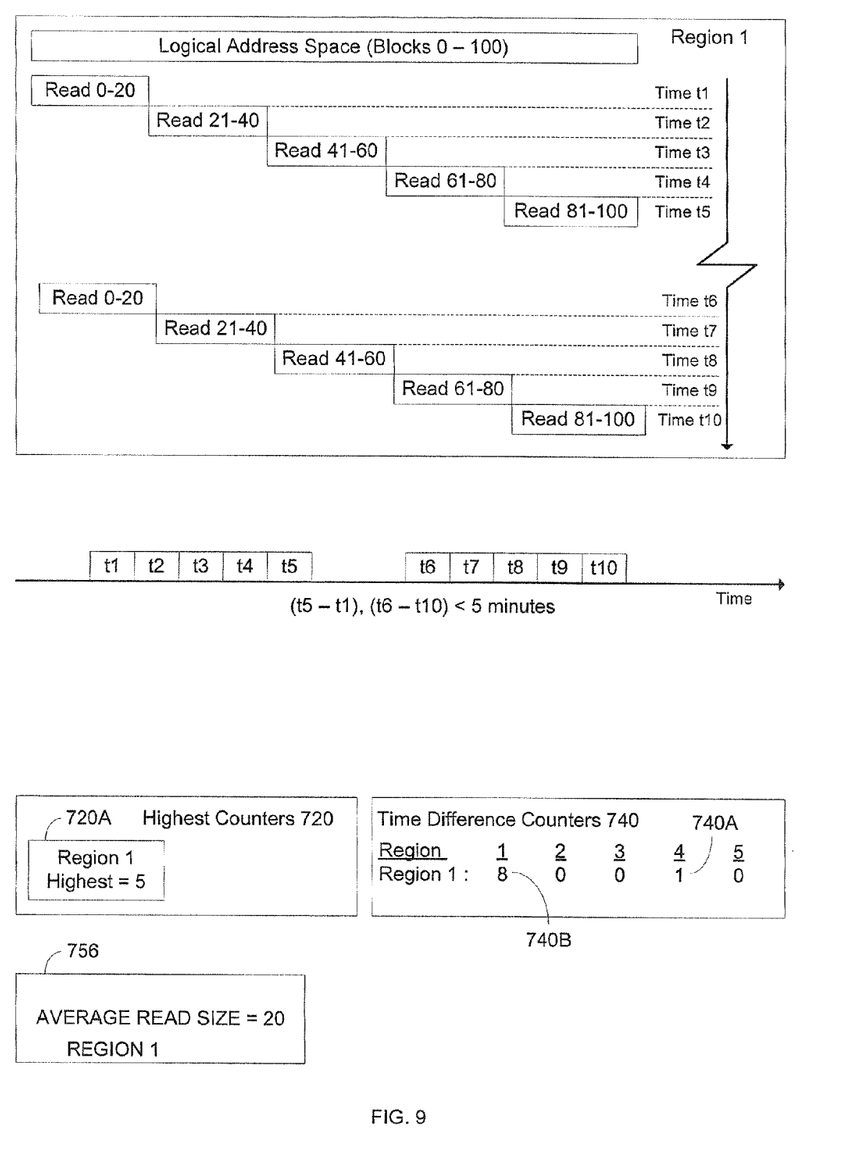
FIG. 9 shows how the prefetch controller in FIGS. 7 and 8 identifies good temporal storage access patterns for prefetching.

FIG. 9 shows the storage access pattern for region 1 previously shown in FIGS. 3 and 4. This access pattern is monitored by the prefetch controller 18 and temporal histogram information is captured using the counters and logic shown in FIGS. 7 and 8. Five consecutive reads to region 1 happen within 5 minutes. Accordingly, the highest counters 720A record a highest count for region 1 of five according to the operation elements that pass through FIFO 500.

The time difference counter 740B for region 1 records eight back to back reads that happen within 0.5 seconds of each other. This corresponds to the four back to back reads between time t1 and t5, and the four back to back reads between time t6 and t10. Accordingly, counter 740B is incremented by the prefetch controller to a value of eight.

There is one back to back read that takes between 5 and 60 seconds. This corresponds to the time between the read of blocks 81-100 at time t5 and the read of blocks 0-20 at time t6. Accordingly, counter 740A was incremented to a value of one.

Two patterns traits typically indicate a region should not be prefetched. One condition is that the back to back reads are too far away from each other in time. The second condition is that not enough back to back read operations occur within a given time period, such as within the example specified value five minutes that data can be stored in the tiring media 16.

To account for both of these conditions a back to back read ratio is determined by first dividing the value 8 in the shortest time interval difference counter 740B by the highest count value 5 in the highest counter 720A for region 1 (e.g., 8÷5=1.6). This provides a ratio for the number of substantially sequential back to back read operations within the 5 minute time window. To determine if too many reads to region 1 are too far apart in time, the read ratio 1.6 is compared with a sum of all of the other counters 720 associated with region 1. This identifies the number of all other back to back reads that were spaced apart in time more than the 0.5 seconds associated with time difference counter 740B.

In this example there is only one additional back to back read operation recorded in counter 740A. This indicates that only one set of two read operations in region 1 were spaced apart more than 0.5 seconds. In this example, the two back to back reads were between 5.0 seconds and 60 seconds apart.

If the read ratio between the value in counter 740B and the value in counter 720A is larger than the sum of the values in the remaining counters 740 associated with region 1, then the region qualifies for prefetching. The prefetching analysis can be summarized as follows:

(Number of Back to Back Reads With Lowest Time Interval÷Largest Number of Reads Within Time Window)≥Sum of Remaining Back to Back Reads With Higher Time Intervals=prefetch.

In this example, since 1.6>1, the prefetch controller 18 identifies region 1 for prefetching. In an alternate embodiment, the ratio of counter 740B and counter 720A need only be greater than or within some margin of the sum of values of remaining counters 740. This margin can be obtained experimentally or programmed through configuration.

As mentioned above, the entire region may not necessarily be prefetched wherever there is a read to region 1. The value in average read size register 756 for region 1 identifies an average read size of 20 blocks. The prefetch controller 18 multiplies the highest count value in counter 720A for region 1 by the average read size value in register 756 for region 1 to derive the prefetch size. In this example the highest count value=5 and the average read size value=20. Accordingly, the prefetch size is determined by the prefetch controller to be 5×20=100. Accordingly, blocks 0-100 are fetched from disk 20 when a client 10 reads blocks 0-20 in region 1.

In this example, the entire region 1 is prefetched. However, assume that region 1 is 200 blocks and includes block 0 through block 200. Also assume that the highest count value in counter 720A is still=5 and the average read size is still 20. In this example, the prefetch size is still 100 blocks. A read to blocks 0-20 would still cause the prefetch controller 18 to prefetch blocks 0-100. However, a read to blocks 101-120 would cause the prefetch controller 18 to prefetch blocks 101-200. Thus, blocks are prefetched starting from the address of the last block in the monitored read operation from client 10. Subsequent reads to region 1 will then be serviced by the storage system 14, if possible, using the data prefetched into tiering memory 16.

This is just one example of a possible scheme for determining which read patterns qualify for prefetching and how much data to prefetch. For example, the read ratio may not necessarily have to be equal or larger than the summation of the values in the other time difference counters 740 and may just need to be within some range of the summation. It should also be understood that all of the preprogrammed values used for analyzing the storage access patterns may be reconfigurable.

Figure 10:
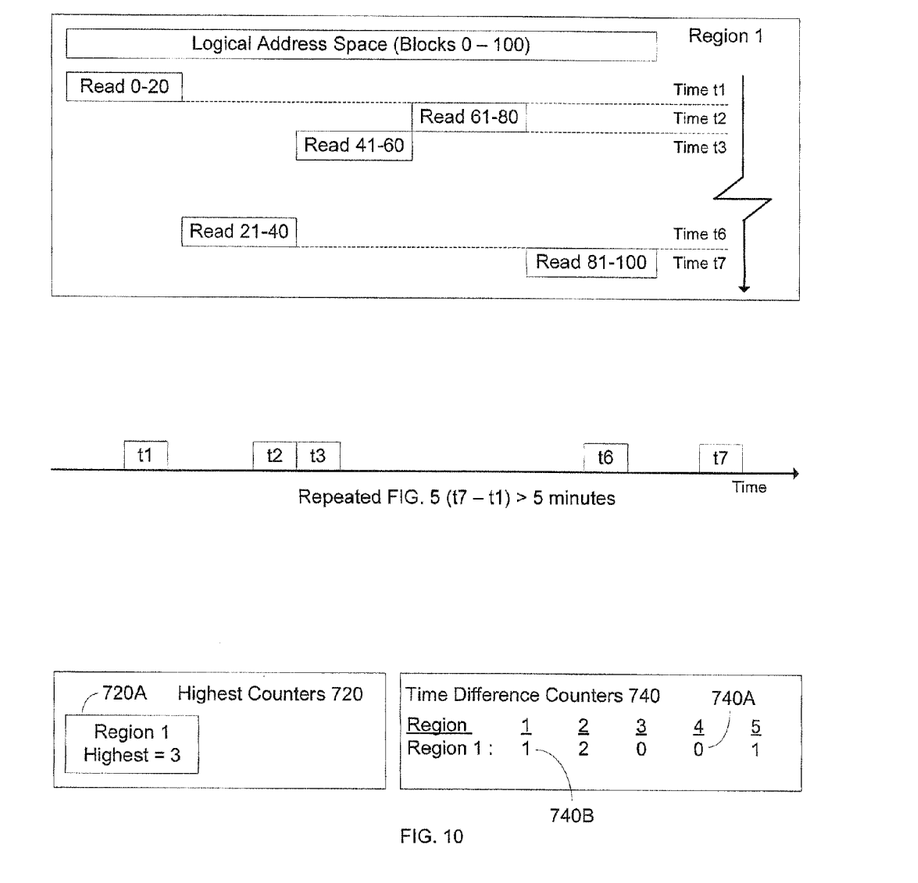
FIG. 10 shows how the prefetch controller in FIGS. 7 and 8 identifies bad temporal storage access patterns unsuitable for prefetching.

FIG. 10 shows the same read pattern previously shown in FIGS. 5 and 6 that is not a good candidate for prefetching. In this example, only the first three read operations happen within 5 minutes. Therefore, the value in highest counter 720A for region 1 is three. One of the back to back read operations was less than 0.5 seconds, two were between 0.5 and 1.0 seconds, and one was greater than 60 seconds.

In this example, the read pattern is analyzed as follows:

(Number of Back to Back Reads With Shortest Time Interval (1)÷Largest Number of Reads Within Time Window (3))<Sum of Remaining Back to Back Reads With Higher Time Intervals (2+1) =No Prefetch.

Since the ratio of the number of back to back read operations with the shorted time interval and the highest count value (1÷3=0.333) is substantially smaller than the sum of the remaining back to back reads with larger time intervals (2+1=3), this read pattern is determined not to qualify for prefetching. Thus, in this example, region 1 will not be prefetched into tiering memory 16 by the prefetch controller 18 and reads to region 1 will be accessed from disk 20.

The scheme described above can quickly and easily compute the current counters 710, highest counters 720, and time difference counters 740 and does not grow in complexity or space requirement over time. The detection of regions with high prefetch potential is also computationally easy to derive from the contents of the counters.

In practice, the storage system 14 can be programmed to prefetch any address range for a region upon the first read to a particular region. Timeouts to the tiering media 16 can be set aggressively when the time difference counters 740 indicate fast sequential access. This additionally improves tiering performance since contents in tiering memory 16 can be quickly removed after the prefetch operation has supplied data for all the reads in a burst period. This optimization allows faster recovery and reuse of tiering resources and is based on the knowledge from time difference counters 740 that the periods of read bursts are intense but far between in time.

The system described above can use dedicated processor systems, micro controllers, programmable logic devices, or microprocessors that perform some or all of the operations.

Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We/I claim all modifications and variation coming within the spirit and scope of the following claims.

The invention claimed is:

1. A system, comprising:
a cache memory; and
a control circuit configured to:
monitor storage operations to a storage device;
identify regions accessed within the storage device;
identify time durations between sequential accesses to the same regions of the storage device;
prefetch data from the regions of the storage device based on the time durations between sequential accesses to the same regions of the storage device; and
store the prefetched data in the cache memory,
wherein a first set of counters track the number of accesses to each of the different regions within a given time window and a second set of counters track a maximum number of accesses to each of the different regions for the given time window.

2. The system of claim 1 wherein the data is prefetched from the storage device into a tiering media and the tiering media comprises memory components that have faster access times than the storage device.

3. The system of claim 2 wherein the tiering media comprises flash memory or Random Access Memory (RAM) integrated circuits and the storage device comprises a disk array.

4. The system of claim 2 wherein the tiering media resides within a storage system.

5. The system of claim 4 wherein the tiering media is distributed among, or shared, with one or more clients connected to the storage system through a network interface.

6. The system of claim 1 wherein the control circuit is configured to monitor storage access patterns to the storage device and dynamically partition storage address areas into the regions according to the storage access patterns.

7. A system, comprising:
a control circuit configured to:
monitor storage operations to a storage device;
identify regions accessed within the storage device;
identify times between sequential accesses to the same regions;
prefetch data from the regions of the storage device based on the times between sequential accesses to the same regions; and
track the times between sequential accesses to the same regions for different time ranges.

8. A system, comprising:
a control circuit configured to:
monitor storage operations to a storage device;

associate storage address areas within the storage device with different regions;

track a number of storage operations to each of the different regions within a given time window;

assign timestamps to the storage operations and determine a number of accesses to each of the different regions within the given time window by incrementing or decrementing a set of counters according to a comparison of the timestamps with a configurable time window value; and prefetch data from the storage device in response to the storage operations based on the number of accesses to each of the different regions.

9. A system, comprising:

a logic circuitry configured to:

monitor storage operations to a storage device;

associate storage address areas within the storage device with different regions;

track storage accesses to the different regions during a given time window;

track a maximum number of storage accesses to the different regions for the given time window; and identify an average size of the storage accesses for each of the different regions and prefetch an amount of data from the different regions according to the average size of the storage accesses for the different regions and the maximum number of accesses to the different regions for the given time window.

10. A system, comprising:

a control circuit configured to:

monitor storage operations to a storage device;

associate storage address areas within the storage device with different regions; track storage accesses to the different regions during a given time window; and prefetch data from the storage device based on the storage accesses tracked to the different regions, wherein:

a first set of counters track the number of accesses to each of the different regions within a given time window, a second set of counters track a maximum number of accesses to each of the different regions for the given time window, and a third set of counters track a number of back to back storage operations that occur within different time intervals for each of the different regions.

11. The system of claim 10 wherein the control circuit assigns timestamps to the storage operations and tracks the number of back to back storage operations that occur within the different time intervals in the different regions by incrementing the third set of counters according to a comparison of the timestamps assigned to the back to back storage operations for the same regions.

12. The system of claim 11 further comprising a First In-First Out (FIFO) circuit that buffers the time stamps, and buffers an identifier of the regions associated with the storage operations, on a first in-first out basis during the given time window.

13. A method, comprising:

identifying time values for accesses to different regions of a storage device;

identifying a time difference between a first one of the time values for an earlier one of the accesses to one of the different regions and a second one of the time values for a later one of the accesses to one of the different regions of the storage device;

incrementing a count number for one of the different regions associated with the later one of the accesses;

decrementing a count number for one of the different regions associated with the earlier one of the accesses when the time difference is outside of a threshold value;

identifying a maximum value for the count number associated each of the different regions; and prefetching data from the different regions based on the maximum value for the count number associated with each of the different regions.

14. A method, comprising:

identifying access patterns for different regions of a storage device;

identifying different time ranges between sequential storage accesses in same regions of the storage device;

identifying a first number for the sequential storage accesses to each of the different regions that are within a given time range;

identifying a second number for all of the other sequential storage accesses to each of the different regions that are outside of the given time range;

identifying a maximum number of storage accesses for each of the different regions that are within a given time window;

identifying ratios for each of the different regions between the first number and the maximum number; and identifying the different regions suitable for prefetching when the ratios for the regions are greater or equal to the second number for the regions.

15. A method, comprising:

identifying access patterns for different regions of a storage device;

determining a length of prefetching for the different regions by multiplying a maximum number of read operations to each of the different regions within a given time window by an average read size for each of the different regions; and prefetching data from the different regions of the storage device that are determined to be suitable for prefetching based on the length of prefetching for the different regions.

16. A method, comprising:

identifying, by a computing device, a number of memory accesses within a predetermined time period;

identifying, by the computing device, times between sequential memory accesses;

classifying, by the computing device, the times between the sequential memory accesses into different time ranges; and prefetching, by the computing device, contents of the memory according to the number of memory accesses, the times identified between the sequential memory accesses, and patterns between the times in the different time ranges.

17. The method of claim 16 further comprising:

identifying a highest number of memory accesses for the predetermined time period; and prefetching contents of the memory according to the identified highest number of memory accesses and the patterns between the times in the different time ranges.

18. The method of claim 17 further comprising:

inserting operation identifiers into a First In-First Out (FIFO) circuit associated with the memory accesses, the identifiers identifying different memory regions where the memory accesses are directed and including timestamps identifying when the memory accesses were received;

removing the operation identifiers from the FIFO that reside in the FIFO beyond the predetermined time period;

identifying a maximum number of operation identifiers for each of the different memory regions that reside in the FIFO at the same time; and using the maximum number of operation identifiers to determine which of the associated memory regions to conduct prefetching.

* * * * *